United States Patent
Izabel et al.

(10) Patent No.: US 9,604,600 B2
(45) Date of Patent: *Mar. 28, 2017

(54) HYDRAULIC CONNECTOR FOR A WINDSCREEN WIPER BLADE WITH SUPPORT FOR VERTICAL SLIDES

(75) Inventors: Vincent Izabel, Chilly Mazarin (FR); Xavier Bousset, Mezel (FR); Guiseppe Grasso, Le Breuil sur Couze (FR); Gérald Caillot, Cernay la Ville (FR); Holger Fitterer, Rheinstetten (DE); Uwe Renz, Filderstadt-harthausen (DE); Andreas Zygan, Malsch (DE); Heiko Schmid, Oberriexingen (DE); Richard Düsterhöft, Holzgerlingen (DE); Steffen Pommerening, Heilbronn (DE)

(73) Assignees: Daimler AG, Stuttgart (DE); Valeo Systems D'Essuyage, La Verriere (FR)

( * ) Notice: Subject to any disclaimer, the term of this patent is extended or adjusted under 35 U.S.C. 154(b) by 783 days.

This patent is subject to a terminal disclaimer.

(21) Appl. No.: 13/991,110

(22) PCT Filed: Dec. 1, 2011

(86) PCT No.: PCT/EP2011/071528
§ 371 (c)(1),
(2), (4) Date: Sep. 22, 2014

(87) PCT Pub. No.: WO2012/072748
PCT Pub. Date: Jun. 7, 2012

(65) Prior Publication Data
US 2015/0026908 A1    Jan. 29, 2015

(30) Foreign Application Priority Data
Dec. 2, 2010 (EP) .................................. 10306340

(51) Int. Cl.
*B60S 1/38* (2006.01)
*B60S 1/40* (2006.01)
(Continued)

(52) U.S. Cl.
CPC .......... *B60S 1/3862* (2013.01); *B60S 1/3851* (2013.01); *B60S 1/4038* (2013.01); *B60S 1/4048* (2013.01);
(Continued)

(58) Field of Classification Search
CPC .............................. B60S 1/524; B60S 1/3862
(Continued)

(56) References Cited

U.S. PATENT DOCUMENTS

2011/0107541 A1    5/2011   Caillot et al.
2011/0113580 A1    5/2011   Caillot et al.
(Continued)

FOREIGN PATENT DOCUMENTS

CN      101304905       11/2008
DE      102007062304     6/2009
(Continued)

OTHER PUBLICATIONS

DE102008049269A1 (machine translation), 2010.*

*Primary Examiner* — Andrew A Horton
(74) *Attorney, Agent, or Firm* — Duane Morris LLP; J. Rodman Steele, Jr.; Gregory M. Lefkowitz (57) ABSTRACT

Assembly for the production of a wiping system, comprising a terminal part (2) of a wiper arm designed to move a wiper blade (3) over the surface to be wiped and a hydraulic connector (30) comprising at least one piping element (31, 32) for conveying a liquid to the wiper blade (3), the said terminal part comprising at least one means (8) for supporting the said hydraulic connector ensuring that it is held longitudinally with reference to the wiper arm. It is charac- (Continued)

terized in that the said supporting means allows a movement of the said hydraulic connector (30) in a direction convergent with the longitudinal direction.

13 Claims, 6 Drawing Sheets

(51) Int. Cl.
*B60S 1/52* (2006.01)
*B60S 1/48* (2006.01)

(52) U.S. Cl.
CPC ............. *B60S 1/524* (2013.01); *B60S 1/3806* (2013.01); *B60S 1/488* (2013.01); *B60S 2001/4054* (2013.01)

(58) Field of Classification Search
USPC ...................................... 15/250.04
See application file for complete search history.

(56) References Cited

U.S. PATENT DOCUMENTS

| | | | |
|---|---|---|---|
| 2011/0185531 A1 | 8/2011 | Egner-Walter et al. | |
| 2013/0298346 A1* | 11/2013 | Bousset | B60S 1/3862 |
| | | | 15/250.01 |
| 2014/0196240 A1* | 7/2014 | Grasso | B60S 1/524 |
| | | | 15/250.04 |

FOREIGN PATENT DOCUMENTS

| | | | | |
|---|---|---|---|---|
| EP | 1985513 | | 10/2008 | |
| EP | 2460700 | | 12/2010 | |
| FR | 102008049269 A1 * | 4/2010 | | B60S 1/381 |

* cited by examiner

HYDRAULIC CONNECTOR FOR A WINDSCREEN WIPER BLADE WITH SUPPORT FOR VERTICAL SLIDES

CROSS-REFERENCE TO RELATED APPLICATIONS

This application is a §371 national stage entry of International Application No. PCT/EP2011/071528, filed Dec. 1, 2011, which claims priority to European Patent Application No. 10306340.0 filed Dec. 2, 2010, the entire contents of which are incorporated herein by reference.

The field of the present invention is that of equipment for vehicles, and more particularly that of equipment for wiping the windows of motor vehicles.

Motor vehicles are normally fitted with windscreen wiper systems in order to wash the windscreen and prevent the view that the driver has of his environment from being disrupted. These windscreen wipers are conventionally driven by a wiper arm making an angular back-and-forth movement and comprising elongated wiper blades, themselves supporting scraper blades made of an elastic material. These blades brush against the windscreen and clear away the water moving it outside the field of vision of the driver. The wiper blades are made in the form either, in a conventional version, of articulated arms which hold the scraper blade in several discrete positions, or, in a more recent version called "flat blade", of a semi-rigid assembly which holds the scraper blade over the whole of its length. In both solutions, the wiper blade is attached to the rotating wiper arm of the windscreen wiper by an assembly consisting of a mechanical connector and an adapter. The mechanical connector is a part that is crimped onto the articulated arm or directly onto the flat blade, while the adapter is an intermediate part which allows the connector to be fixed to the wiper arm of the windscreen wiper. These two parts are connected to one another via a transverse spindle which allows their relative rotation in a plane perpendicular to the windscreen passing through the wiper arm.

Windscreen wipers are also fitted with devices for conveying a windscreen-washing liquid which is brought from a tank situated on the vehicle and which is sprayed towards the windscreen by nozzles situated either around the windscreen or on the windscreen wiper itself for a better distribution of the liquid. In the case of nozzles placed on the wiper blades, the windscreen-washing liquid is brought, before being distributed between them, by piping elements that are fixed to the wiper arm of the windscreen wiper and that are connected to the distribution system of the wiper blade at the mechanical connector by a rigid part, called a hydraulic connector. These piping elements, which are usually flexible and two in number in order to ensure cleaning in both the outward and the return directions of the wiper blade, lead into the hydraulic connector which is fixed to the mechanical connector by appropriate fittings and which ensures the necessary seal with it. The mechanical connector thus comprises orifices capable of accommodating, by a sealed connection, the said fittings of the hydraulic connector.

On models for top-of-the-range vehicles, there are also devices for heating the windscreen wiper in order to defrost the wiper blade in the event of severe cold and prevent it from sticking to the windscreen under the action of the frost. These devices, which are more specially adapted to flat blades, usually comprise a heating device integrated into the assembly that supports the scraper blade and on which electrical resistors are placed. They also require an electric connection device capable of interacting with the mechanical connector in order to transmit to the heating device the electric current that comes from the vehicle. The electric connector is usually attached to the hydraulic connector before the latter is installed on the mechanical connector in order to be affixed thereon at the same time as it. Quick-connection devices then ensure contact between the pins of the electric connector and those of the mechanical connector and finally contact with the heating resistors of the assembly supporting the scraper blade.

Document WO2010/034445 shows an embodiment of a mechanical connector which accommodates a hydraulic connector through which the windscreen-washing liquid travels. It also shows an electric connector which supplies the mechanical connector with electricity.

Although the liquid piping elements and the hydraulic connector are usually connected to the wiper arm of the windscreen wiper, the mechanical connector is connected to the wiper blade and it is necessary to provide for the connection of the hydraulic connector, and if necessary of the so electric connector, to the mechanical connector when there is a change of wiper blade. This operation is usually carried out. In a position, called the service position, in which the wiper blade is positioned relative to the wiper arm so as to form an angle, by rotation about the transverse spindle connecting the mechanical connector to the adapter.

It is necessary to ensure that the hydraulic and electric connectors are correctly aligned during their installation in the mechanical connector, otherwise a misassembly would result in a risk of leakage of the windscreen-washing liquid at the junction of the two connectors and/or a bad electric contact. This operation is carried out blind, the hydraulic connector being situated under the top portion of the wiper arm, which prevents a good view of the parts to be assembled. Document WO20 10/034445 does not make it possible to align the hydraulic connector relative to the mechanical connector because the hydraulic connector is mounted isostatically on the wiper blade, thus preventing any relative movement of one relative to the other.

Moreover, when the wiper blade is uncoupled or removed from the wiper arm, it is important that the hydraulic connector, and, if necessary, the electric connector if it is attached thereto, remain attached to the wiper arm. This prevents the hydraulic connector from being pulled by the mechanical connector in its movement of separation from the wiper arm of the windscreen wiper. Moreover, it is not acceptable to leave the hydraulic connector hanging under the terminal part of the windscreen wiper arm when the wiper blade is removed.

Finally, when reinstalling, it is not conceivable to ask the operator to hold the hydraulic connector in position with one of his hands while asking him to reinstall the wiper blade on the arm with the other hand. Such a situation makes the installation of the wiper blade particularly difficult and not very user-friendly because merely installing the wiper blade on the arm already requires the use of both hands, one of these hands being dedicated to the wiper blade and the other to the windscreen wiper arm.

It is therefore important to make it easier to insert and remove the hydraulic connector from the mechanical connector and to see to it that the connection and the disconnection are carried out correctly, even if an operator is inexperienced. The same applies for the electrical continuity to be provided between the pins of the electric connector and those of the mechanical connector.

The object of the present invention is to remedy these drawbacks by proposing a device making it possible to guide the hydraulic connector when it is inserted into the mechanical connector and to hold it in place on the arm when the latter is removed. This guidance function can also perform that of the electric connector when the latter is first mounted on the hydraulic connector.

Accordingly, the subject of the invention is an assembly for the production of a wiping system, comprising a terminal part of a wiper arm designed to move a wiper blade and a hydraulic connector comprising at least one piping element for conveying a liquid to the wiper blade, the said terminal part extending in a longitudinal direction and comprising at least one means for supporting the said hydraulic connector ensuring that it is held in the longitudinal direction, characterized in that the said supporting means allows a movement of the said hydraulic connector in a direction convergent with the longitudinal direction.

The freedom of movement of the hydraulic connector allows an automatic alignment of the hydraulic connector with a mechanical connector linked to the wiper blade, and therefore a securing of the two parts without risk of a leak of the windscreen-washing liquid at their connection and according to a particularly easy application.

According to a first feature of the invention, the movement allows the hydraulic connector to move closer to or further from the terminal part.

According to a second feature of the invention, the supporting means allows the hydraulic connector to rotate relative to the terminal part.

According to another feature of the invention, the movement and the rotation take place in a plane passing through the said longitudinal direction and perpendicular to the plane swept by the wiper arm when wiping.

Advantageously, the supporting means is an insert secured to the terminal part. This configuration has the advantage of easier integration of the hydraulic connector on the terminal part.

Preferably, the hydraulic connector comprises at least one lateral excrescence and the supporting means at least one slot in which the said excrescence is housed.

In a first embodiment, the said slot has a shape of a groove extending in the said plane and capable of guiding the said excrescence in its movement of the hydraulic connector closer to or further from the terminal part.

In alternative embodiments, the said hydraulic connector comprises a rotation-immobilization lock and the said supporting means comprises a device for immobilizing the rotation of the hydraulic connector by interaction with the said lock, when the said hydraulic connector is in a position of maximum distance from the wiper arm.

Advantageously, the said rotation-immobilization device forms a hard spot for the passage of the said lock into and out of a rotation-immobilization position.

In a second embodiment, the immobilization lock is a ridge extending longitudinally and the immobilization device is a longitudinal narrowing of the slot.

In a third embodiment, the immobilization lock is a ridge extending longitudinally and the immobilization device is a tooth of a tab that can flex in the direction perpendicular to the plane of movement of the hydraulic connector.

The invention also relates to a wiping-system connection device comprising a terminal part of a wiper arm designed to move a wiper blade over the surface to be wiped, a wiper blade, a mechanical connector fixed to the said wiper blade in order to attach it to the wiper arm by means of an adapter and a hydraulic connector comprising at least one piping element for conveying a liquid to the wiper blade, the said adapter being inserted between the wiper arm and the mechanical connector in order to allow the mechanical connector to rotate relative to the wiper arm between a position of use and a position of service, characterized in that it comprises an assembly formed of a terminal part and a hydraulic connector as described above.

Advantageously, the mechanical connector comprises at least one locking means for locking the said hydraulic connector onto the mechanical connector. This ensures that the two connectors are properly secured and that there is no leak of windscreen-washing liquid at their junction.

In a particular embodiment, the locking means is an arm extending longitudinally with respect to the mechanical connector capable of interacting with a lock forming an excrescence and extending laterally from the hydraulic connector.

According to a preferred embodiment, the said locking means forms a hard spot for the passage of the said lock into and out of the locked position. This hard spot tells the operator that the connection has been made effectively.

Preferably, the said lock is a trunnion and the arm is slotted in the longitudinal direction in order to form two parallel branches which have, between them, a circular cutout formed to receive the said trunnion.

Advantageously, the hydraulic connector is supported by the supporting means when the mechanical connector is in service position.

Preferably, the hydraulic connector is, in the service position, held in place by the supporting means and prevented from rotating so that its piping element is in line with the corresponding orifice on the mechanical connector, rotation being released in the service position.

In a particular embodiment, the hydraulic connector is free, in the position of use, to move in translation in the plane passing through the said longitudinal direction and perpendicular to the plane swept by the wiper arm during wiping.

The invention will be better understood, and other objects, details, features and advantages of the latter will appear more clearly, during the detailed explanatory description that follows of several embodiments of the invention given as examples that are purely illustrative and not limiting, with reference to the appended schematic drawings.

It should be noted that the figures reveal the invention in a detailed manner and that they can naturally be used to define the invention better if necessary.

In the rest of the description, the terms "longitudinal" or "lateral" refer to the orientation of the wiper arm on which the windscreen wiper blade is mounted. The longitudinal direction corresponds to the main axis of the wiper arm in which it extends while the lateral orientations correspond to convergent straight lines, that is to say lines which cross the longitudinal direction, notably perpendicular to the longitudinal axis of the wiper arm in its rotational plane. For the longitudinal directions, the terms "outer" or "inner" are understood relative to the point of attachment of the wiper blade to the wiper arm, the term "inner" corresponding to the portion where the wiper arm and a half-wiper blade extend. Finally, the directions referenced as upper or lower correspond to orientations perpendicular to the rotational plane of the wiper arm, the term "lower" containing the plane of the windscreen.

Figure 1:
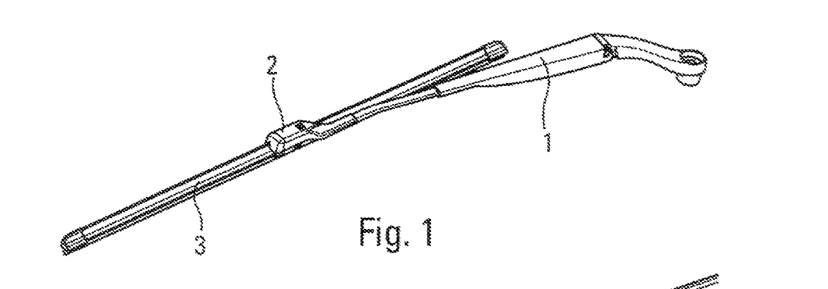
FIG. 1 is a general view, in perspective, of a wiping system for a window of a motor vehicle.
Figure 2:
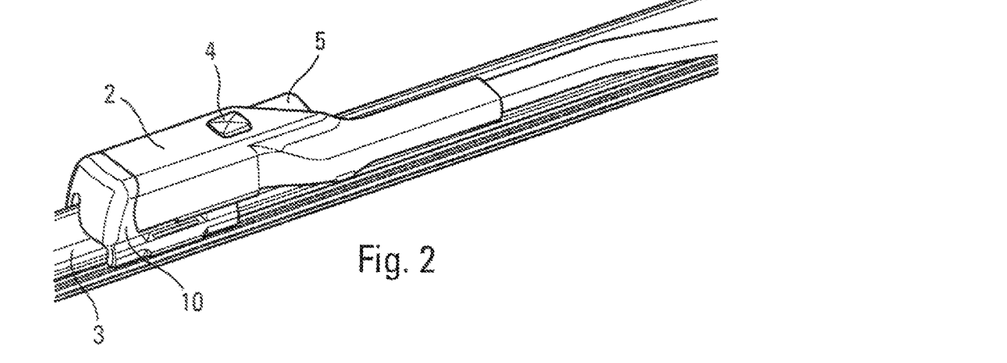
FIG. 2 is a detailed view of FIG. 1, showing the connection between the wiper arm and the windscreen wiper blade.

FIGS. 1 and 2 show a windscreen wiper consisting of a wiper arm or arm 1 extended at its outer end by a terminal part 2 which is fixed, on the inside, by crimping on the wiper arm 1. The terminal part 2 covers an adapter 20 which carries the wiper blade 3 by means of its mechanical connector 10. The purpose of the adapter 20 is to be inserted into the terminal part 2 by a translation movement along a longitudinal axis, in order to come into the position of use, where it is positioned in abutment against an interacting shape given to the terminal part 2. It is then fixed there reversibly by means of a retractable locking button 4 which interacts with a recess made for this purpose in the upper portion of the terminal part.

Figure 3:
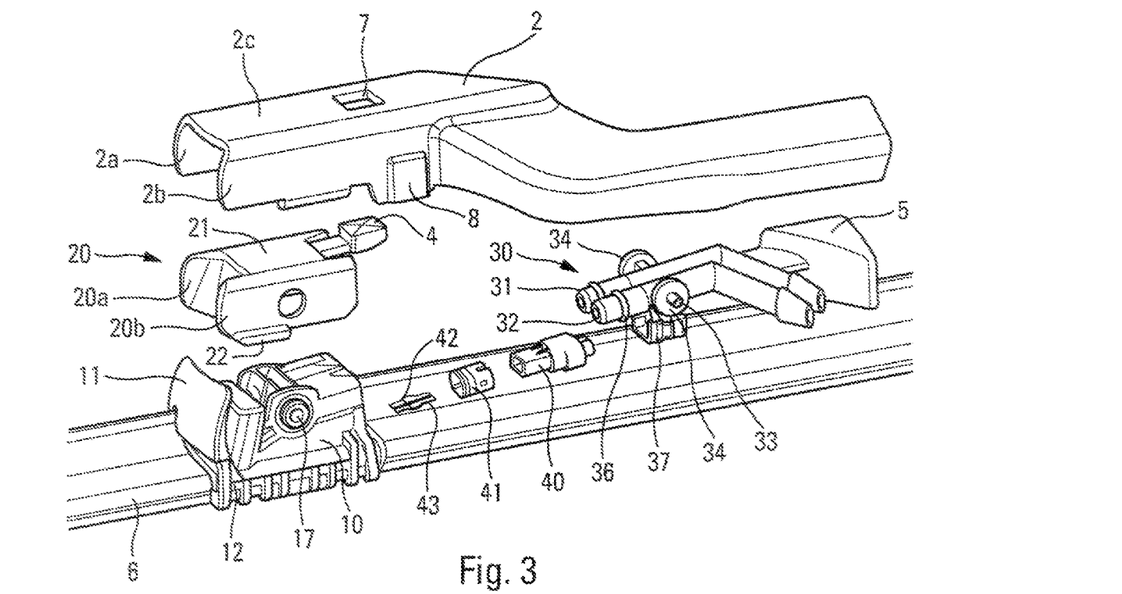
FIG. 3 is an exploded view of a windscreen wiper comprising a wiper arm and a hydraulic connector according to the first embodiment of the invention.

Referring now to FIG. 3, the detail of the elements attaching the wiper blade 3 to the wiper arm 1 can be seen.

The terminal part 2 has the shape of an inverted "U" in which the opening of this "U" shape faces the windscreen. This terminal part 2 comprises a base 2c on the upper portion and two lateral branches 2a and 2b extending in the direction of the window. On the base 2c an orifice 7 is made in which the retractable locking button 4 of the adapter 20 is housed. The lower end face of each lateral branch comprises an edge folded at 90° in the direction of the inner volume defined by the base and the branches, which has the function on the one hand of longitudinally guiding the insertion of the adapter 20 and, on the other hand, of serving as a translation abutment to corresponding abutments placed on the adapter 20. To each lateral branch of the terminal part a supporting means 8 is attached, the function of which is to support the hydraulic connector and to hold it in translation when the wiper blade 3 is removed while allowing other movements, which is one of the objects of the invention and which will be described in detail below.

The adapter 20 has the shape of a yoke matching the inner volume of the terminal part 2 so as to be housed in the latter. Two lateral walls 20a and 20b are joined by a bridge 21 and each comprise at their free ends a rim 22 folded towards the outside of the adapter. These rims 22 form a translation abutment when they rest against the folded edges of the lateral branches of the terminal part 2. This adapter 20 also comprises two holes that are made through its lateral walls 20a and 20b and that have a coincident axis, designed to serve as an axis of rotation between the wiper blade 3 and the wiper arm 1 when the wiping system incorporating the hydraulic connector is assembled. Specifically, the wiper blade must have at least one degree of rotational freedom relative to the wiper arm 1, and more specifically relative to the terminal part 2, in order to allow the wiper blade 3 to follow the curvature of the window to be wiped.

The mechanical connector 10 is secured irremovably to the wiper blade 3 so as to transmit the mechanical force from the wiper arm 1 to the wiper blade 3. It has a substantially parallelepipedal shape extending in the axis of the wiper blade, with two lateral sides from which two trunnions 17 extend laterally which have the function, on the one hand, of securing the mechanical connector to the adapter 20 and, on the other hand, of serving, by their interaction with the holes made in the lateral walls 20a and 20b of the adapter, as an axis for the rotation of the wiper blade 3 relative to the wiper arm 1.

On the outside, the mechanical connector 10 has a wall 11, called a cap, which firstly closes the front portion of the terminal part 2 and acts as a screen to protect the components contained inside this terminal part 2 and, secondly, provides a well-crafted outer finish. The face opposite to the cap 11, called the inner face, comprises orifices (not visible) for hydraulic and electric connection with the corresponding elements of the hydraulic connector 30 and of the electric connector 40.

This inner face of the mechanical connector 10 comprises two hydraulic inlet orifices extended by inner channels for distribution of the windscreen-washing liquid, which are designed to interact with the piping elements 31 and 32 of the hydraulic connector 30 which provide it with liquid. These distribution channels (not shown in the figures) extend inside the mechanical connector 10 to emerge level with supply ducts 12 of the spray tubes 6 for the spraying of the liquid by the wiper blade; as indicated above, these tubes extend along the two edges of the wiper blade 3 in order to spray the windscreen-washing liquid when the wiper blade moves back and forth. The inner face of the mechanical connector also comprises orifices forming female connectors capable of accommodating male pins 42 and 43 supported by the electric connector 40, which provide the electric power necessary for the heating element incorporated into the wiper blade to operate.

The hydraulic connector 30 takes the form of two piping elements 31 and 32 positioned in parallel longitudinally and connected mechanically to one another by securing or connecting bridges 35. As an example, when the piping element 31 or 32 forms a tube of cylindrical section, the direction of extension of the piping element is formed by a centred straight line of the cylindrical section.

These piping elements 31 and 32 each comprise two sectors which extend in directions oriented angularly relative to one another, the junction between these sectors forming an elbow. Such a structure makes it possible to adapt the shape of the piping elements 31 and 32 to the shape of the terminal part 2 under which they are placed. On the inside, these piping elements each comprise a stepped or shouldered coupling to which flexible windscreen-washing liquid supply pipes are fitted which run along the wiper arm 1 from the tank of liquid. On the outside, each of the piping elements 31 and 32 has a cylindrical shape capable of being inserted into the orifice of one of the inner distribution channels of the mechanical connector 10. O-rings are placed close to this outer end in order to ensure the seal between the piping elements 31 and 32 and the orifices of the distribution channels which they enter.

On its lower part, the hydraulic connector 30 comprises coupling means 37 designed to interact with corresponding supporting means on the electric connector, in the configuration in which the electric connector is supported by the hydraulic connector and fixed to it before the assembly is coupled to the mechanical connector 10. As shown in FIG. 3, the coupling means 37 consist of a cradle or a U-shaped element closing over the lower face of the hydraulic connector 30, into which the body of the electric connector 40 is inserted. Means for immobilizing the electric connector in longitudinal translation on the hydraulic connector 30 may also be used so as to prevent the electric connector from being removed after is put in place, it is quite clear that any other method of coupling the electric connector 40 to the hydraulic connector 30, or even an absence of coupling, the latter being then carried out directly on the mechanical connector, can be envisaged without departing from the context of the invention.

Laterally, the hydraulic connector 30 comprises two excrescences 34 in the form of discs extending in a vertical plane parallel to the piping elements, which each support a trunnion 33 on their outer face. These trunnions, of cylindrical section, develop or extend laterally to form a spindle, the length of which is close to the width of the terminal part 2, while remaining shorter than that width in order to allow the hydraulic connector 30 to move in the inner portion of the terminal part 2. Finally, on the inside, the hydraulic connector 30 supports, in the first embodiment, a pushbutton 5 or grip button, of cylindrical shape with triangular section, one of the faces of which extends perpendicularly to the direction of extension of the piping elements 31 and 32 so as to allow, by pushing longitudinally on this button 5, the piping elements 31 and 32 to be inserted into the distribution channels of the mechanical connector.

As shown, the electric connector 40 comprises a body which is inserted into the coupling means 37. The electric connector also receives a sealing device 41 slipped over the body. This sealing device 41 seals the electric connection between the electric connector and the mechanical connector. The body 40 is pierced longitudinally by two hollow tubes into which metal connectors are placed providing the electric connection between the power-supply wires (not shown) leading from the passenger compartment via the arm 1 and male pins 42 and 43 which provide the electric connection with the electric circuit inside the mechanical connector 10 which passes through it to reach the heating resistors of the scraper blade.

Figure 4:
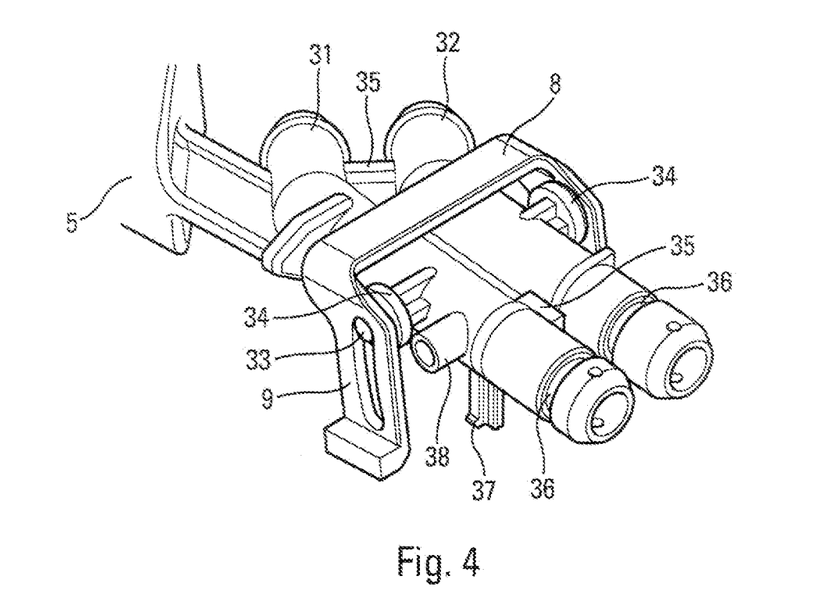
FIG. 4 is a view in perspective of the hydraulic connector of FIG. 3 and of its supporting means on the wiper arm according to the first embodiment.

Now referring to FIG. 4, the detail of a hydraulic connector 30 according to the first embodiment of the invention can be seen. The two so piping elements 31 and 32 are parallel and connected to one another by two securing bridges 35 so as to form a one-piece part, terminating at its inner end with the pushbutton 5. O-rings are placed in a groove 36 close to the outer end of each of the piping elements 31 and 32 in order to seal them with the corresponding inner distribution channels of the mechanical connector 10. Two disc-shaped excrescences 34 or excrescences with a flat angular sector extend vertically on either side of each of the piping elements 31 and 32 and are moulded with these piping elements. Each of them supports a trunnion 33 which extends laterally, perpendicular to the two discs and engages in a groove-shaped slot 9 made in the supporting means 8. These two trunnions 33 form a rotation spindle giving the hydraulic connector a degree of freedom to rotate relative to the terminal part 2.

The hydraulic connector 30 also comprises a lock or longitudinal locking trunnion 38 which extends laterally from one of the piping elements 31, on the outside relative to the trunnion 33 supported by this piping element 31, and the extension of which corresponds substantially to that of the trunnion 33. It is therefore understood that the direction of extension of the lock 38 and the direction of extension of the trunnion 33 are parallel.

The purpose of this locking trunnion 38 is to serve as a means for preventing a translation in the longitudinal direction for the hydraulic connector 30 when it is inserted into the mechanical connector 10. This locking trunnion 38 also generates a hard spot when this same hydraulic connector is removed from the mechanical connector.

The supporting means 8, which, in use, is fixed to the terminal part 2, has the shape of a yoke which remains permanently fixed to the terminal part 2 while being lodged against the inner surface of the latter. This supporting means 8 comprises, at each of its ends, two edges folded at 90° to the outside in order to engage in ad hoc slots made in the lateral faces 2a and 2b of the terminal part 2 to ensure its longitudinal positioning relative to the terminal part 2. The supporting means 8 comprises, on each of its lateral faces, a slot 9, which goes right through or is blind, which forms a groove, having a shape in an arc of a circle of the "banana" type. These two slots 9, in which the trunnions 33 can move, give an additional degree of freedom to the hydraulic connector 30 in a direction that is convergent and distinct from the longitudinal direction, by allowing it to follow the mechanical connector to which it is fixed in use and to absorb the angular differences that exist between the wiper arm 1 and the mechanical connector 20 of the wiper blade 3 when the latter moves over the window. This convergent direction is for example a vertical direction. They also perform a function of longitudinal locking of the hydraulic connector, by trapping its trunnions 33 in order to secure it to the terminal part 2 when the wiper blade 3 is removed from the wiper arm 1.

Figure 5:
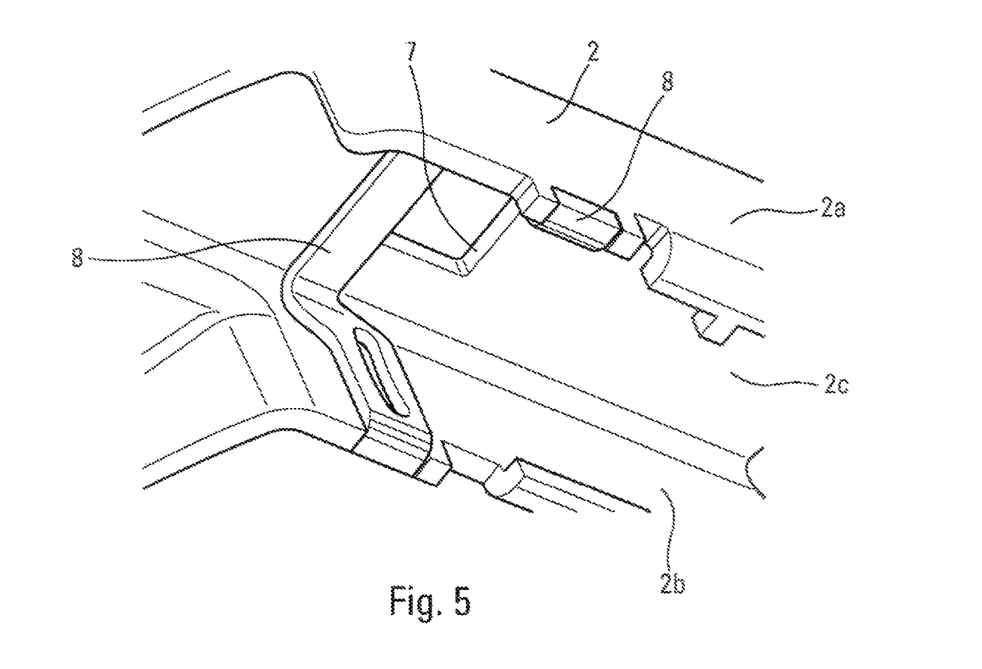
FIG. 5 is a view in perspective, from below, of the wiper arm of FIG. 3 and of its supporting means, according to the first embodiment.

FIG. 5 shows the terminal part 2 of the wiper arm 1 fitted with the supporting means 8 bonded against the inner faces of the terminal part 2, with its edges folded outwards in place in the slots made in the lateral faces 2a and 2b.

Figure 6:
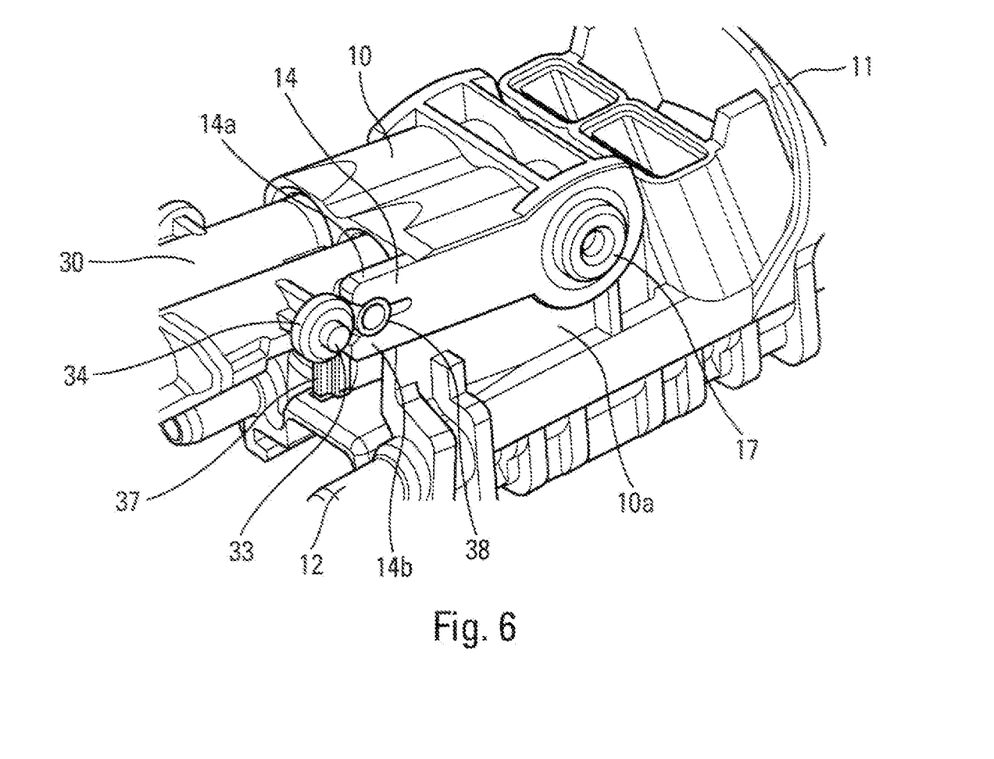
FIG. 6 is a view in perspective of the hydraulic connector of FIG. 3 installed in a mechanical connector according to the first embodiment.

FIG. 6 shows the hydraulic connector 30 mounted on the mechanical connector 10, as it is in the position of use or in the service position before the two elements are separated. The piping elements 31 and 32 are inserted into the terminal orifices of the inner windscreen-washing liquid distribution channels. In the connection position, shown in the figure, the hydraulic connector 30 is pushed into the mechanical connector 10 and the seal is provided by O-rings which are not visible because they are situated inside these inner channels. The mechanical connector 10 comprises, on one of its lateral faces 10a, a locking means which takes the form of a longitudinal extension moulded onto the lateral face of the mechanical connector 10. This locking means has the shape of an arm 14 which has the function of interacting with the locking trunnion 38 supported by one of the piping elements 31 of the hydraulic connector. For this the longitudinal end of the arm 14 is slotted in the longitudinal direction in order to form two parallel branches 14a and 14b which have, between them, a circular cutout formed to receive the locking trunnion 38. These branches are capable of separating from one another in order to allow the trunnion to pass when the hydraulic connector 30 is inserted and then to return to their initial position because of their elasticity to trap this locking trunnion 38 and prevent it from coming out of the circular cutout again when the hydraulic connector is in the final position, that is to say inserted into the mechanical connector. The presence of this cutout makes it necessary to apply a sufficient pulling force to the hydraulic connector to remove it from the mechanical connector, which force is defined to be greater than the forces that are applied in use, so that there is no unintended decoupling. It also generates a hard spot which allows the operator to confirm that the hydraulic connector 30 is correctly inserted onto the mechanical connector 10 when the wiper blade 3 is installed.

Figure 7:
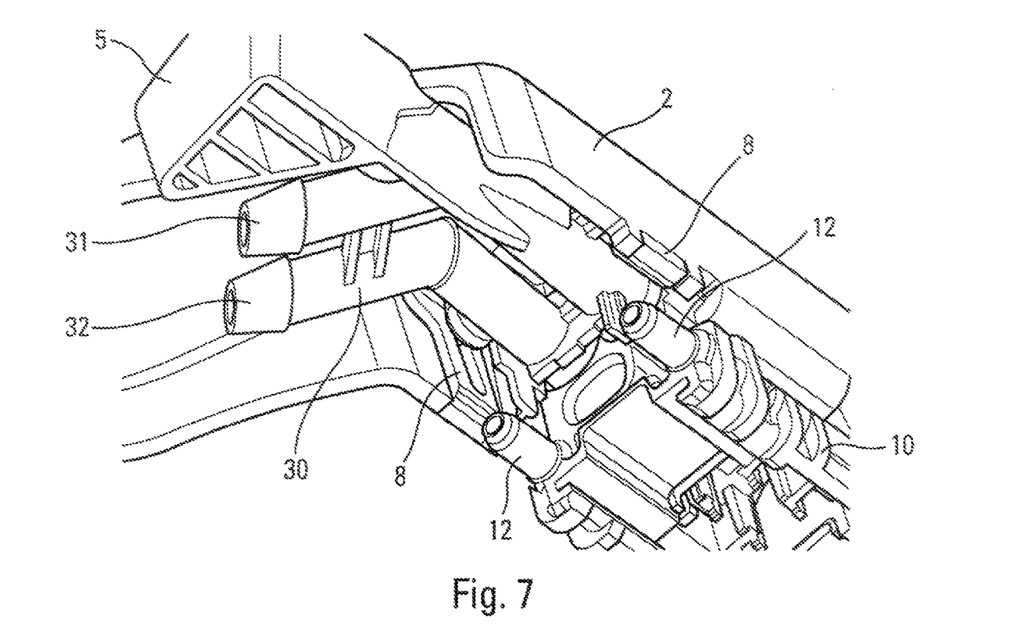
FIG. 7 is a view in perspective, from below, of the mechanical connector of FIG. 6 mounted on a windscreen wiper arm.

FIG. 7 shows, for its part, the terminal part 2 supporting the mechanical connector 10 to which the hydraulic connector 30 is coupled with its trunnions inserted into the slot 9 of the supporting means 8.

Figure 8:
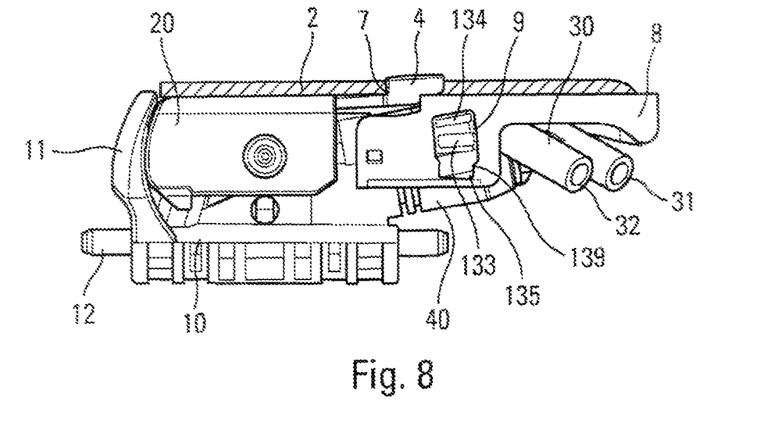
FIG. 8 is a front view, in partial section, of a wiping device according to a second embodiment of the invention, in the position of use.
Figure 9:
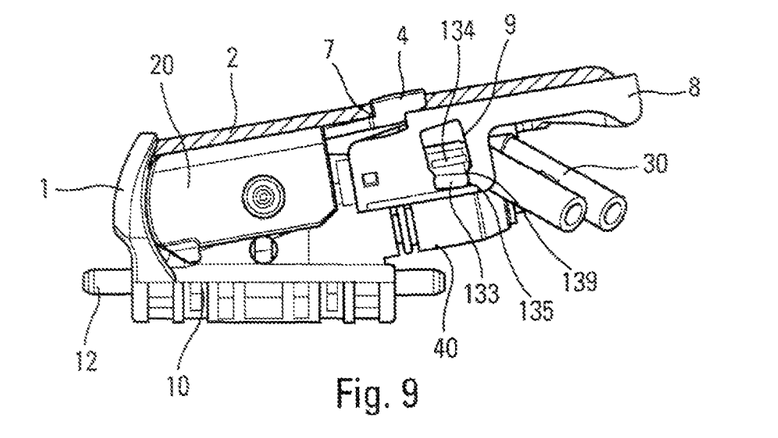
FIG. 9 is a front view, in partial section, of the wiping device of FIG. 8, in the service position.
Figure 10:
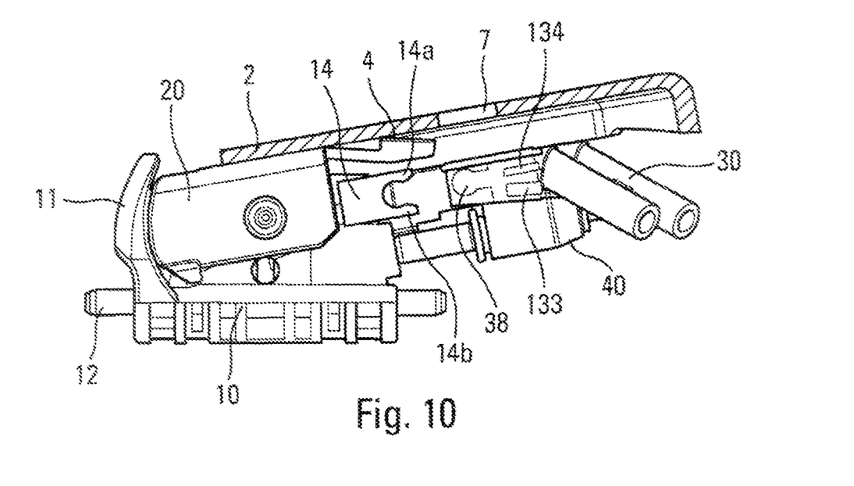
FIG. 10 is a front view, in partial section, of the wiping device of FIG. 8, the hydraulic connector being in the intermediate position on the mechanical connector.

With reference now to FIGS. 8 to 10, a second embodiment of the invention will be described.

In FIG. 8, the wiper blade 3 is in the position of use with the terminal part 2 folded over the mechanical connector 10 which, for its part, is attached by the interaction of the retractable locking button 4 of the adapter 20 with its orifice 7. The terminal part 2 supports, as before, a supporting means 8, in the shape of a yoke, which is incorporated into its inner portion, to which it is rigidly fixed. The supporting means 8 thus forms an insert which conforms to the shape of the inner wall of the terminal part.

This exemplary embodiment of the supporting means 8 has, on each of its lateral faces, as in the first embodiment, a slot 9 or groove, which goes right through or is blind, in the form of an arc of a circle, designed to accommodate corresponding locking ridges 133 forming a lateral protrusion relative to the hydraulic connector 30. This slot 9 has a substantially rectangular shape extending vertically, the long side of which is curved. Its width is constant over the majority of its long side with a narrowing 139 close to the short underside before resuming its initial width on this short underside, thus delimiting a lower portion 135 forming a rotation-immobilization means for a bottom ridge 133 of the hydraulic connector. This narrowing 139 also forms a hard spot for the entrance or exit of the bottom locking ridge 133 in the lower portion 135.

The hydraulic connector 30 is similar to that described for the first embodiment except that the lateral excrescences consist of two locking ridges, a bottom ridge 133 which butts against the short underside of the rectangle of the slot 9 when the mechanical connector is in the service position, and a top ridge 134 which butts against the short upper side of the rectangle of the slot 9 when the mechanical connector is in the position of use.

In the latter position, the bottom ridge 133 has passed the hard spot due to the narrowing 139 and the two ridges have a certain freedom of movement between, on the one hand, the top ridge 134 butting against the short upper side and, on the other hand, the bottom ridge 133 coming into contact with the narrowing 139 of the width of the rectangle. This degree of freedom corresponds to the need to allow the mechanical connector 10 and the wiper blade 3 to move angularly relative to the wiper arm 1 in order to follow the shape of the window during the travel of the wiper arm.

The transition from the service position to the position of use, or vice versa, takes the form of the passing of the bottom ridge 133 through the narrowing 139 of the rectangle of the slot 9, which requires a sharp action of the operator in order to snap the bottom ridge into the lower portion 135, which generates a sensation of passing a hard spot in order to tell the operator that his action has been properly achieved.

While FIG. 8 shows the wiper blade in the position of use with the bottom ridge 133 having a range of angular freedom, FIG. 9 shows the wiper blade in the service position. The bottom ridge 133 is snapped into the lower portion 135 of the rectangle of the slot 9, which secures the hydraulic connector 30 to the supporting means 8 and consequently to the terminal 2 is part 2 and the wiper arm 1.

FIG. 10 shows the removal of the hydraulic connector 30 from the mechanical connector 10. The wiper blade having been previously placed in the service position, the bottom ridge 133, not shown here, has been inserted into the lower portion 135 of the rectangle of the slot 9, also not shown. From this position, a tension force has been applied in the longitudinal direction by the operator, which causes the hydraulic connector 30 to separate from the mechanical connector 10 and which reveals the securing means that exist between them when they are in the position or use.

As in the first embodiment, one of the lateral faces of the mechanical connector 10 comprises a longitudinal extension in the form of an arm 14 which has the function of interacting with a locking trunnion 38 supported by one of the piping elements 31 of the hydraulic connector 30, positioned on the outside relative to the ridges 133 and 134. The longitudinal end of the arm 14 is again slotted in the longitudinal direction in order to form two parallel branches 14a and 14b which have between them a circular cutout formed to receive the locking trunnion 38 and form a hard spot at the end of insertion of the hydraulic connector 30 into the mechanical connector 10. This securing then provides the seal between the two elements when the wiper arm rotates in normal use.

Figure 11:
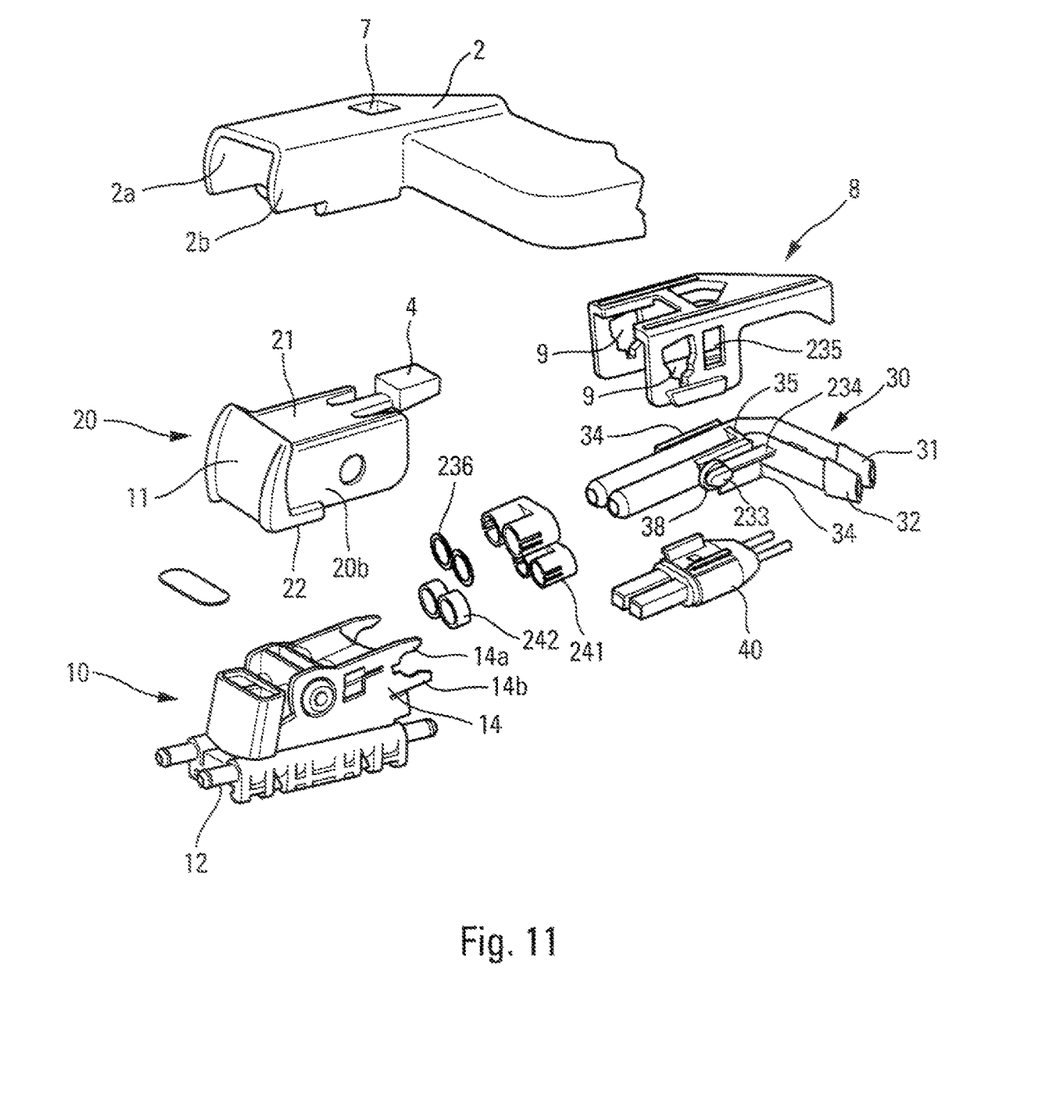
FIG. 11 is an exploded view of the elements constituting a wiping device according to a third embodiment.
Figure 12:
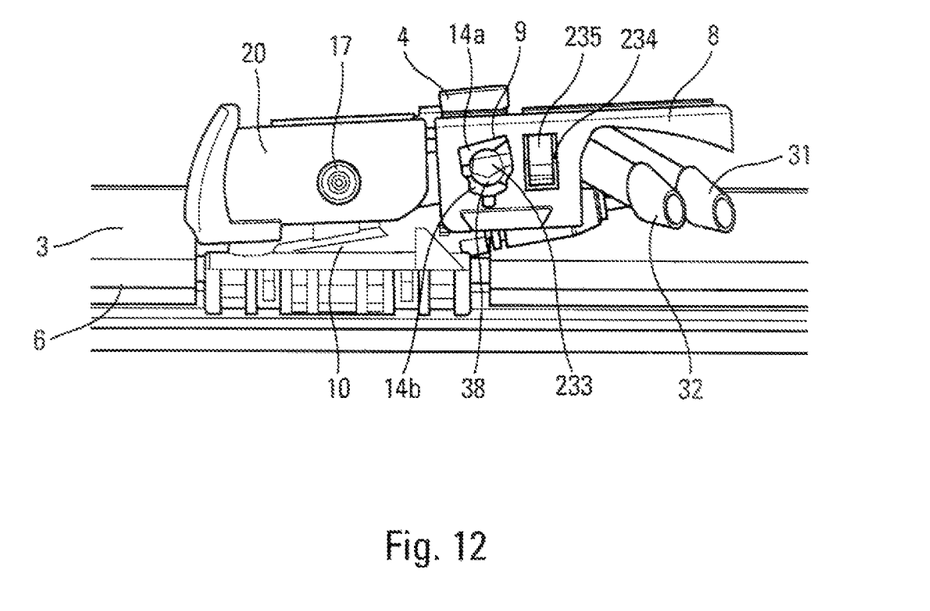
FIG. 12 is a front view, in partial section, of a wiping device of FIG. 11, assembled in the position of use.

With reference now to FIGS. 11 and 12, a third embodiment will now be described.

FIG. 11 shows all of the elements forming a connection device for a wiping system according to the third embodiment. The elements that are identical to the first two embodiments are indicated by the same reference number and are not described again.

In this instance, the supporting means 8 has a slot 9, that goes right through or is blind, having substantially a rectangular shape extending downwards in a triangular ridged shape. The supporting element of the hydraulic connector which interacts with the supporting means 8 is, in this instance, an excrescence 233 extending laterally from the hydraulic connector and having a triangular shape reproducing, in like manner, the hollow shape of the lower triangular portion of the slot 9. The principle of operation remains the same as in the second embodiment, namely that the excrescence 233 fits into the bottom of the slot 9 when the wiper blade is moved into the service position. This excrescence 233 can move downwards, that is to say in a direction converging with the longitudinal direction of the wiper arm, in the upper portion of this slot, in the position of use. The hydraulic connector 30 can therefore follow the movements of the wiper blade 3 without being locked by its relationship with the terminal part 2 during the back-and-forth movements of the wiper blade on the window or by the associated relative movements of the wiper blade and of the wiper arm.

In this embodiment, the connector 30 comprises two lateral flats 34 positioned on each piping element, from which extend first of all the locking trunnions 38, which are intended to be inserted into the arm 14 of the mechanical connector 10, and the two excrescences 233 which extend above the said locking trunnions 38. These flats 34 also support two ridges 234 extending longitudinally rearwards, that is to say on the inside of the windscreen wiper, and their purpose is to serve as an element for immobilizing the hydraulic connector 30 on the supporting means 8 when the wiper blade 3 is in the service position. The purpose of these ridges 234, when there is a transition from one position of use or of service to the other, is to be passed over by flexible tabs 235 positioned on the supporting means 8 behind the slot 9. The flexible tabs 235 terminate in a tooth on which passing over the ridges produces a hard spot which, on the one hand, secures the hydraulic connector 30 to the supporting means 8 in the position of service and, on the other hand, tells the operator that engagement in the service position has indeed taken place. This function is similar to that of the engagement of the bottom ridge 133 in the bottom portion of the rectangle of the slot 9 in the second embodiment.

As shown, the electric connector 40 comprises a body which is inserted into coupling means originating from the hydraulic connector. The electric connector also receives a sealing device 242 slipped over the body of the electric connector. This sealing device 242 seals the electric connection between the electric connector and the mechanical connector. An O-ring 236 provides the hydraulic seal between each piping element 31 or 32 and the duct or channel made in the mechanical connector which receives the end of this piping element. A retention part 241 formed by four tubular elements is slipped over the piping elements of the hydraulic connector 30 and over an interlocking portion of the electric connector 40. This retention part stops the O-rings 36 and the sealing device 242. In other words, the retention part 241 forms an abutment with respect to the O-rings and the sealing device so as to ensure their placement and therefore their function.

Finally, FIG. 12 shows a hydraulic connector 30 inserted into a mechanical connector 10 in the position of use. The excrescence 233 is in the top portion of the slot 9, that is to say that it has complete latitude to move in a direction converging with the longitudinal direction, for example vertically. The hydraulic connector thus follows the mechanical connector in the travel of the wiper blade 3 over the window, the hydraulic connector 30 being aligned with it. Similarly, the ridge 234 is above the tooth of the tab 235 forming a hard spot and its movement is also allowed beyond the tooth.

The locking trunnion 38 is inserted into the circular cutout of the arm 14 of the mechanical connector 10, thus securing the hydraulic connector 30 to the mechanical connector 10 and sealing their connection by means of the O-rings 236 (visible in FIG. 11).

The replacement of a wiper blade on a windscreen wiper arm comprising a hydraulic connector according to the first embodiment of the invention will now be described including the removal of the worn wiper blade and its replacement by a new wiper blade. The replacement of a wiper blade according to the second and third embodiments is carried out in a to similar manner.

The operator begins by placing the wiper blade 3 in the service position, moving it away angularly from the longitudinal direction of the wiper arm 1 and of the terminal part 2. The hydraulic connector 30 is held longitudinally by its trunnions 33 which are kept in the cavities 9 of the supporting means 8 of the two lateral faces 2a and 2b of the terminal part, but it retains a freedom of movement to rotate about the spindle supporting its trunnions. It can therefore move along this cavity during this movement. In the second and third embodiments, this movement is accompanied respectively by a securing of the bottom ridge 133 or of the ridge 234 with the supporting means 8, while passing a hard spot which tells the operator of this securing. In this instance it involves the transition from the position of use to the service position.

This movement to the service position causes the wiper blade 3 to turn relative to the adapter 20, which remains aligned with the terminal part 2 on which it is mounted. After having separated the adapter 20 from the terminal part 2 by pressing on the retractable button 4 in order to take it out of the orifice 7, the operator can slide the adapter into the sliders formed by the folded edges of the lateral faces 2a and 2b of the terminal part, either by pulling on the adapter 20 or on the mechanical connector 10. By pulling on the adapter, the operator releases the locking trunnion 38 extracting it from the circular cutout of the arm 14 of the mechanical connector 10, which allows a relative movement of the adapter, of the mechanical connector 10 and of the wiper blade 3 relative to the terminal part 2 until the wiper blade 3 is fully separated from the wiper arm 1.

The installation of a new wiper blade is carried out in the reverse, the hydraulic connector 30 being placed in the supporting means 8 and, in particular, in the second and third embodiments, first being engaged in the bottom position of the slot 9. In these two embodiments, the orientation of the piping elements 31 and 32 of the hydraulic connector 30 relative to the terminal part 2 is then such that they will be naturally aligned with the orifices of the inner liquid distribution channels of the mechanical connector 10 when mounted. The adapter 20 is first of all opened in order to place it at an angle with the mechanical connector 10 and is then aligned with the terminal part 2 before being inserted into the inner volume of the terminal part and pushed until its edges 22 butt against the corresponding abutments of the lateral faces 2a and 2b of the terminal part.

During this operation, the mechanical connector 10 comes gradually closer to the hydraulic connector 30 and, in the first embodiment, the operator turns the hydraulic connector 30 about the trunnions 33 by acting on the pushbutton 5 in order to bring it to an angular position in which the piping elements 31 and 32 are in line with the inner channels of the mechanical connector.

In the other two embodiments, this operation is carried out without the intervention of the operator, the alignment being predefined as indicated above by interaction between the rotation-immobilization lock and the supporting means. Specifically, the angle imposed by this interaction places the hydraulic connector relative to the terminal part of the wiper blade at an angle that is identical or similar to the angle of insertion of the mechanical connector onto the terminal part in the service position. The presence of a pushbutton 5 is then no longer necessary. By continuing the action of pushing the mechanical connector 10 and the adapter 20 against the terminal part 2, the piping elements 31 and 32 are inserted into the inner channels of the mechanical connector and ensure that the windscreen-washing liquid is supplied to the spraying tubes 6.

Then the operator recloses the wiper blade 3 against the wiper arm 1, that is to say moves it from the service position to that of use. The trunnion 38 remains immobilized in the arm 14 of the mechanical connector which secures these two parts together and avoids any fear of this hydraulic connection separating during use. The closure of the wiper blade 3 on the wiper arm 1 and the descent of the adapter 20 against the mechanical connector 10 causes, respectively in the second and third embodiments, the bottom ridge 133 of the bottom portion 135 to come out of the cavity 9 or the ridge 234 to pass over the terminal tooth of the flexible tabs 235. The hydraulic connector is then no longer secured to the terminal part 2 and can follow the relative movements of the mechanical connector relative to the wiper arm when the window is wiped.

The invention claimed is:

1. A wiping system connection device comprising:
a wiper blade (3),
an assembly comprising a terminal part (2) of a wiper arm (1) designed to move the wiper blade (3), and a hydraulic connector (30),
a mechanical connector (10) fixed to the wiper blade in order to attach the wiper blade to the wiper arm (1) by means of an adapter (20) and the hydraulic connector (30),
the adapter being inserted between the wiper arm (1) and the mechanical connector (10) in order to allow the mechanical connector (10) to rotate relative to the wiper arm (1) between a position of use and a position of service,
the hydraulic connector (30) comprising at least one piping element (31, 32) for conveying a liquid to the wiper blade (3), and
the terminal part extending in a longitudinal direction and comprising at least one means (8) for supporting the hydraulic connector (30) ensuring that it is held in the longitudinal direction, wherein the supporting means allows a movement of the hydraulic connector (30) in a direction that crosses the longitudinal direction,
wherein the mechanical connector (10) comprises at least one locking means (14) for locking the said hydraulic connector (30) onto the mechanical connector (10).

2. The device according to claim 1, in which the movement allows the hydraulic connector (30) to move closer to or further from the terminal part (2).

3. The device according to claim 1, in which the supporting means (8) allows the hydraulic connector (30) to rotate relative to the terminal part (2).

4. The device according to claim 3, in which the movement and the rotation take place in a plane passing through the said longitudinal direction and perpendicular to a plane swept by the wiper arm when wiping.

5. The device according to claim 1, in which the hydraulic connector comprises at least one lateral excrescence (33, 133, 233), the supporting means comprising at least one slot (9) in which the at least one excrescence (33, 133, 233) is housed.

6. The device according to claim 5, in which the at least one slot (9) has a shape of a groove extending in the said plane and capable of guiding the at least one excrescence (33, 133, 233) in a movement of the hydraulic connector (30) closer to or further from the terminal part (2).

7. The device according to claim 6, in which the said hydraulic connector comprises a rotation-immobilization lock (133, 234) and the said supporting means (8) comprises a device (135, 235) for immobilizing the rotation of the hydraulic connector by interaction with the said lock, when the said hydraulic connector is in a position of maximum distance from a segment of the wiper arm (1).

8. The device according to claim 7, in which the said rotation-immobilization device (135, 235) forms a hard spot for the passage of the said lock (133, 234) into and out of a rotation-immobilization position.

9. The device according to claim 7, in which the immobilization lock is a ridge (133) extending longitudinally and the immobilization device is a longitudinal narrowing (139) of the at least one slot (9).

10. The device according to claim 7, in which the immobilization lock is a ridge (234) extending longitudinally and the immobilization device is a tooth of a tab (235) that can flex in a direction perpendicular to a plane of movement of the hydraulic connector (30).

11. The device according to claim 1, in which the locking means is an arm (14) originating from the mechanical connector (10) capable of interacting with a lock (38) which extends laterally from the hydraulic connector (30).

12. The device according to claim 11, in which the said locking means forms a hard spot for the passage of the said lock into and out of the locked position.

13. The device according to claim 12, in which the said lock is a trunnion (38) and in which the arm (14) is slotted in the longitudinal direction in order to form two parallel branches (14a, 14b) which have, between them, a circular cutout formed to receive the said trunnion (38).

* * * * *